(12) United States Patent
Sorensen et al.

(10) Patent No.: US 6,217,813 B1
(45) Date of Patent: Apr. 17, 2001

(54) METHOD OF RAPID INJECTION MOLDING OF ELONGATED ARTICLES, SUCH AS CABLE TIES

(75) Inventors: Soren Christian Sorensen, San Diego; Jens Ole Sorensen, Rancho Santa Fe, both of CA (US)

(73) Assignee: GB Electrical, Inc., Milwaukee, WI (US)

( * ) Notice: Subject to any disclaimer, the term of this patent is extended or adjusted under 35 U.S.C. 154(b) by 0 days.

(21) Appl. No.: 08/251,385

(22) Filed: May 31, 1994

Related U.S. Application Data

(62) Division of application No. 07/811,576, filed on Dec. 20, 1991, now Pat. No. 5,372,773.

(51) Int. Cl.[7] ................................................. B29C 45/44
(52) U.S. Cl. ........................ 264/328.1; 264/318; 264/334
(58) Field of Search ................................... 264/334, 335, 264/328.1, 328.12, 318; 425/129.1, 436 R, 437

(56) References Cited

U.S. PATENT DOCUMENTS

| | | |
|---|---|---|
| 3,093,865 | 6/1963 | Peters et al. . |
| 3,159,878 | 12/1964 | Scott, Jr. et al. . |
| 3,537,676 * | 11/1970 | Miller .................................. 425/588 |
| 3,776,676 | 12/1973 | Kessler ................................ 425/250 |
| 3,898,315 * | 8/1975 | Haag .................................... 264/334 |
| 4,076,483 | 2/1978 | Smirne ................................. 425/444 |
| 4,238,106 * | 12/1980 | Willingham ........................... 249/59 |
| 4,354,995 * | 10/1982 | Wiechard ............................ 264/275 |
| 4,427,618 | 1/1984 | Sorensen ........................... 264/328.9 |
| 4,432,127 * | 2/1984 | Diazzi ................................. 425/588 |
| 4,666,323 * | 5/1987 | Kessler ................................ 264/334 |
| 4,776,067 * | 10/1988 | Sorenson ............................. 24/16 PB |
| 4,880,587 * | 11/1989 | Fichlseder et al. ................... 264/334 |
| 4,902,218 * | 2/1990 | Leonard ........................... 264/328.15 |
| 4,944,475 * | 7/1990 | Ono et al. ........................... 24/16 PB |
| 5,006,288 * | 4/1991 | Rhodes, Jr. et al. ................. 264/275 |
| 5,028,225 * | 7/1991 | Staheli ................................ 425/588 |
| 5,053,179 * | 10/1991 | Masu et al. .......................... 264/275 |

FOREIGN PATENT DOCUMENTS

| | | |
|---|---|---|
| 1485656 | 2/1970 | (DE) . |
| 1800861 | 5/1970 | (DE) . |

* cited by examiner

*Primary Examiner*—Angela Ortiz
(74) *Attorney, Agent, or Firm*—Edward W. Callan

(57) ABSTRACT

In a method of injection molding an elongated article, such as a cable tie, having a head and a strap terminating in a tip, (a) the article is formed by injecting molten plastic material, such as nylon, into a mold cavity defined between a first mold part and a second mold part, wherein the first mold part includes a head region defining a portion of the head of the elongated article, the second mold part includes a tip region defining a portion of the tip of the elongated article, and the portion of the mold cavity defined by the second mold part defines a series of pointed teeth on one side of the strap; (b) the first mold part is separated from the second mold part while retaining the portion of the head of the elongated article in the head region of the first mold part and the portion of the tip of the elongated article in the tip region of the second mold part, thereby separating the head from the second mold part, the tip from the first mold part, and a major portion of the strap of the elongated article from both the first and second mold parts; and (c) the first mold part is further separated from the second mold part while retaining said portion of the head of the elongated article in the head region of the first mold part to thereby remove the portion of the tip of the elongated article from the second mold part.

9 Claims, 2 Drawing Sheets

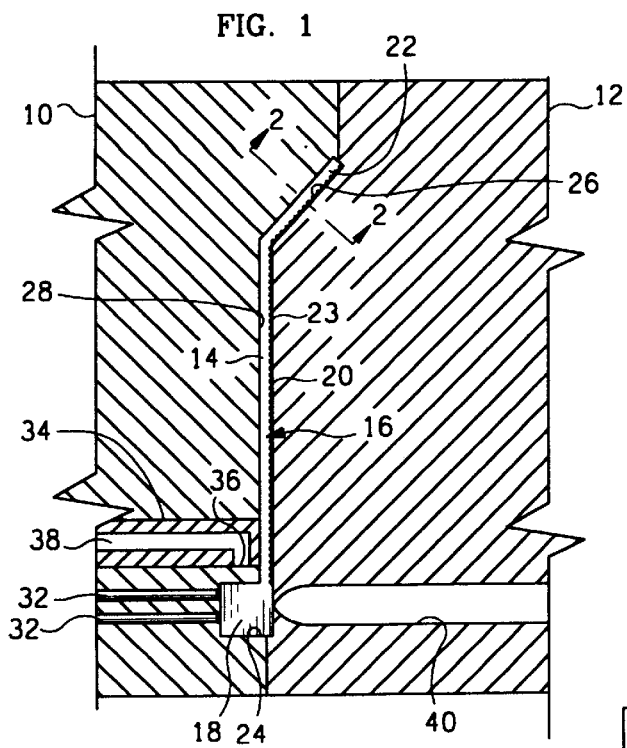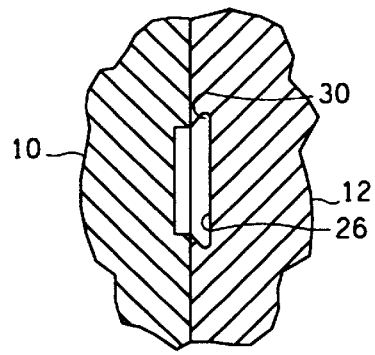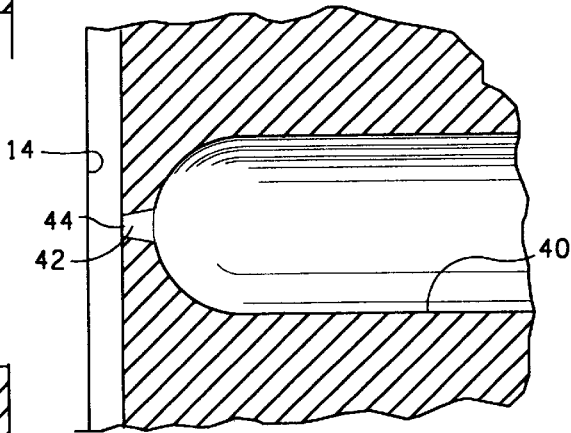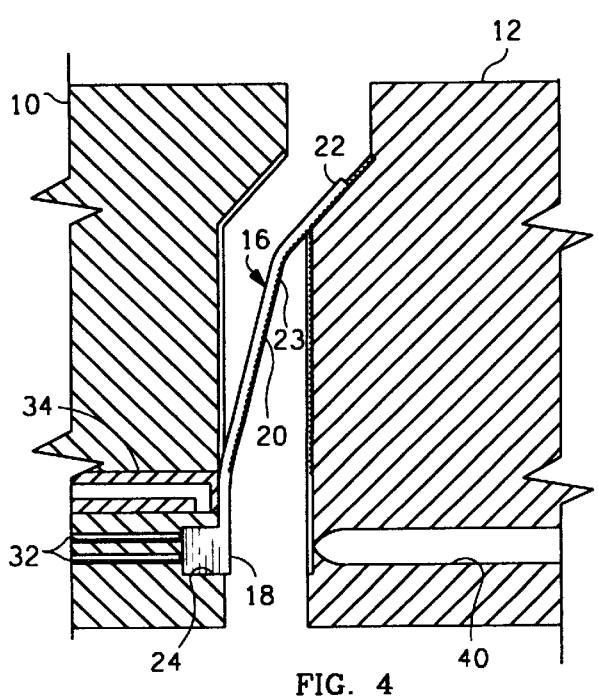

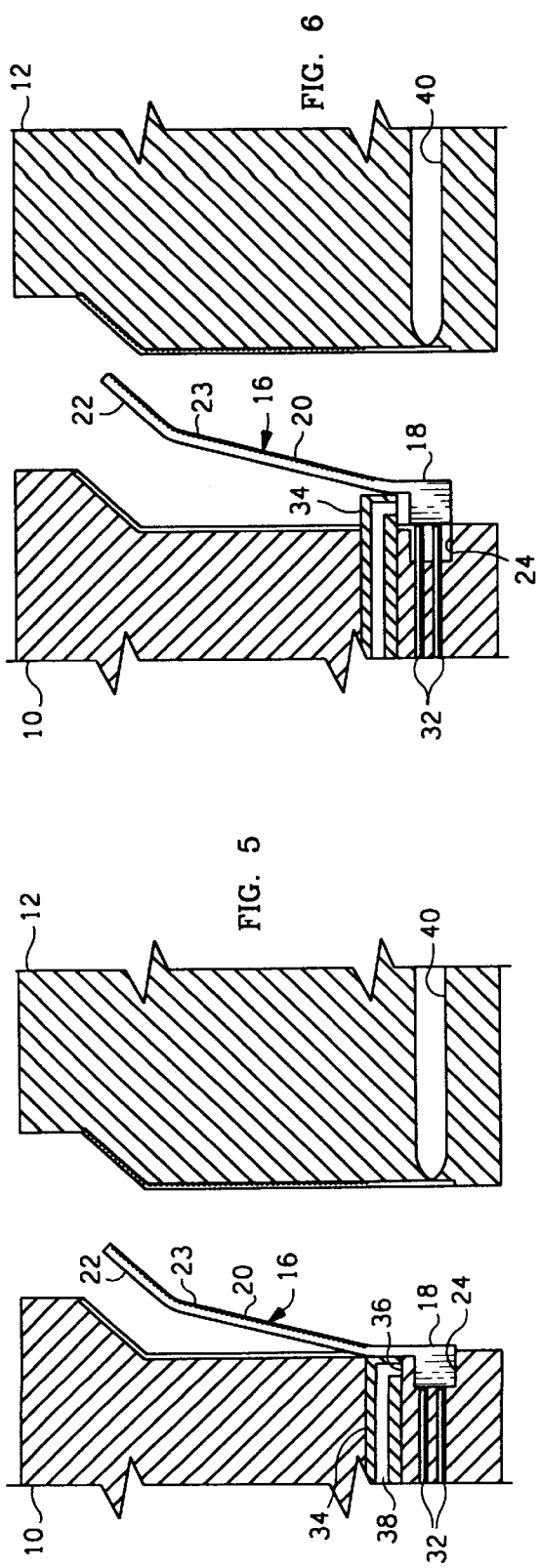

METHOD OF RAPID INJECTION MOLDING OF ELONGATED ARTICLES, SUCH AS CABLE TIES

This is a division of application Ser. No. 07/811,576, filed Dec. 20, 1991, now U.S. Pat. No. 5,372,773.

BACKGROUND OF THE INVENTION

The present Invention generally pertains to injection molding of elongated articles, such a cable ties, and is particularly directed to methods for reducing the cycle time for injection molding of such elongated articles.

A cable tie is an adjustable strap for bundling together articles such as cables or the like. Cable ties are also known as cable straps, cable clamps, cable clips, bundling ties, bundling straps, bundling clips, bundle ties, bundling belts, wire ties, ring clamps, adjustable clamps, harnessing devices, strap seals, binding straps, and ties. A typical cable tie includes an elongated strap with an adjacent locking head at one end of the strap, a tip at the opposite end of the strap and ratchet teeth on one side of the strap. The locking head defines an opening for allowing the tip end of the strap to be pulled through the opening and thereby form a closed loop around a bundle of articles. The locking head typically further includes a pawl having teeth with surfaces for engaging the ratchet teeth to lock the strap in the locking head after the tip end of the strap has been pulled through said opening. Examples of cable ties are described in U.S. Pat. Nos. 3,739,429, 3,924,299, 3,965,538, 4,473,524 and 4,573,242.

Cable ties are manufactured economically by a cyclic injection molding method, in which molten plastic material is injected into a mold cavity defining the cable tie and then allowed to solidify within the mold cavity. The mold parts defining the mold cavity are then separated and the cable tie is ejected, first from the mold parts and then from the space between the mold parts. A preferred material for cable ties is nylon.

SUMMARY OF THE INVENTION

The present invention provides methods for rapid injection molding of elongated articles, such as cable ties.

In accordance with one aspect of the present invention, a method of injection molding a cable tie having a locking head, and a strap terminating in a tip for passing through said head and ratchet teeth on one side of the strap, wherein the locking head includes a pawl having teeth with surfaces for engaging the ratchet teeth to lock the strap in the locking head after the tip end of the strap has been pulled through the head, includes the steps of (a) forming the cable tie by injecting molten plastic material into a mold cavity defined between a first mold part and a second mold part, wherein the first mold part includes a head region defining a portion of the head of the cable tie and the second mold part includes a tip region defining a portion of the tip of the cable tie; (b) separating the first mold part from the second mold part while retaining said portion of the head of the cable tie in the head region of the first mold part and said portion of the tip of the cable tie in the tip region of the second mold part, to separate the head from the second mold part, to separate the tip from the first mold part, and to separate a major portion of the strap of the cable tie from the first and second mold parts: (c) further separating the first mold part from the second mold part while retaining said portion of the head of the cable tie in the head region of the first mold part to thereby remove said portion of the tip of the cable tie from the second mold part; and (d) ejecting the head of the cable tie from the head region of the first mold part. By retaining a portion of the head in the first mold part and a portion of the tip in the second mold part, while the first and second mold parts are separated from each other, the major portion of the strap is quickly peeled from the first and second mold parts to reduce the overall cycle time.

Additional features and advantages of the present invention are described in relation to the description of the preferred embodiment.

BRIEF DESCRIPTION OF THE DRAWING

FIG. 1 is a sectional view of a preferred embodiment of the mold apparatus of the present invention, with the mold parts being combined to define the mold cavity for forming a cable tie.

FIG. 2 is a sectional view taken along lines 2—2 in FIG. 1 of a portion of the mold cavity, without the cable tie being present therein.

FIG. 3 is a view of that portion of FIG. 1 illustrated the juncture of the runner system with the mold cavity, with such portion being enlarged to illustrate the gate by which the runner system communicates with the mold cavity.

FIG. 4 is a sectional view of the mold apparatus of FIG. 1, with the mold parts being separated and the cable tie being partially removed from the mold cavity.

FIG. 5 is a sectional view of the mold apparatus of FIGS. 1 and 4, with the mold parts being further separated and the tip of cable tie being completely separated from the mold cavity.

FIG. 6 is a sectional view of the mold apparatus of FIGS. 1, 4 and 5, with the mold parts being further separated and the cable tie being completely ejected from the mold cavity.

FIG. 7 is a sectional view of the mold apparatus of FIGS. 1, 4, 5 and 6, with the cable tie being ejected from between the mold parts by a forceful fluid stream directed from a closely adjacent nozzle after the cable tie is completely ejected from the mold cavity and separated from the ejector pins.

The various features shown In the drawing are not drawn to scale.

DESCRIPTION OF THE PREFERRED EMBODIMENT

Referring to FIG. 1, a preferred embodiment of the injection molding apparatus of the present invention includes a first mold part 10 and a second mold part 12. The first mold part 10 is combined with second mold part 12 to define a mold cavity 14 for forming a cable tie 16. The cable tie 16 has a head 18 and a strap 20 terminating in a tip 22 for passing through the head 18. The portion of the mold cavity 14 defined by the second mold part 12 defines a series of teeth 23 on one side of the strap 20.

The first mold part 10 includes a head region 24 defining a major portion of the head 18 of the cable tie; and the second mold part 12 Includes a tip region 26 defining a portion of the tip 22 of the cable tie. The tip region 26 extends at an angle from a portion 28 of the mold cavity 14 dining most of the strap 20, with said extension being directed away from the bulk of the first mold part 10.

Referring to FIG. 2, the tip region 26 includes an undercut region 30 from which the portion of the tip 22 formed therein can be removed only by sliding the tip 22 from the undercut region 30 by pulling the strap 20 of the cable tie 16 from the direction of the head 18.

Again referring to FIG. 1, the first mold part 10 further includes a pair of protractable ejector pins 32 and a protractable component 34 containing a nozzle 36 and an air passage 38 that communicates with a source of compressed air (not shown). The ejector pins 32 are disposed to penetrate the head region 18 from within the first mold part 10, when the ejector pins 32 are protracted.

The second mold part 12 includes a runner system 40, through which molten plastic material, such as Nylon 6.6, is injected into the mold cavity 14 to form the cable tie 16.

Referring to FIG. 3, the runner system 40 is an insulated runner system that communicates with the mold cavity 14 through a gate 42 that converges toward the mold cavity 14. It Is pointed out that the runner system 40 communicates with the mold cavity 14 through only the gate 42 and not through a sprue cavity for forming an ejectable sprue, whereby no ejectable sprue is formed.

Unlike prior art apparatus for injection molding cable ties, the converging gate 42 does not have a hot tip adjacent thereto for applying heat to the plastic being injected into the mold cavity 14. A heated tip Is unnecessary because of the shortness of the injection cycle achieved in accordance with the method of the present invention. Heretofore, It has not been possible to injection mold nylon products as light as from one to five grams while using an insulated runner system without heated tips. Through use of the present invention, it has been proven possible to injection mold products in a range of one to five grams at a weight per cycle-time-squared of from 0.1 to 0.5 grams per square second.

By providing a gate 42 that converges toward the mold cavity 14, the cable tie 16 separates from the molten plastic at the edge 44 of the mold cavity 14 when the cable tie is separated from the mold cavity 14 to thereby at least substantially reduce the size of any gate spill formed on the cable tie 16. The method of the present invention has been successfully practiced with a gate opening diameter at the edge 44 of the mold cavity 14 being within a range of between approximately 1.5 mm and approximately 2.5 mm, and with the angle of convergence between the walls of the gate 42 being within a range of between approximately 15 degrees and approximately 30 degrees. A gate opening diameter of 1.8 mm and an angle of convergence of 22 degrees are preferred when injecting Nylon 6.6.

Referring to FIG. 4, the first mold part 10 is separated from the second mold part 12 while retaining the major portion of the head 18 of the cable tie 16 in the head region 24 of the first mold part and a portion of the Up 22 of the cable tie 16 in the undercut region 30 of the second mold part 12, in order to separate the head 18 of the cable tie from the second mold part 12, to separate the tip 22 from the first mold part 10, and to separate a major portion of the strap 20 of the cable tie 16 from both the first and second mold parts 10, 12. By retaining a portion of the head 18 in the first mold part 10 and a portion of the tip 22 in the second mold part 12, while the first and second mold parts 10, 12 are separated from each other, the major portion of the strap 20 is quickly peeled from the first and second mold parts 10, 12 to reduce the ejection portion of the overall cycle time.

Referring to FIG. 5, the first mold part 10 is further separated from the second mold 12 part while still retaining the major portion of the head 18 of the cable tie 16 in the head region 24 of the first mold part 10 to thereby remove the tip 22 of the cable tie from the tip region 26 of the second mold part 12 by pulling the strap 20 of the cable tie 16 from the direction of the head 18 to slide the tip 22 from the undercut region 30. It is noted that due to such pulling action, the angle at which the tip 22 of the cable tie 16 extends away from a straight line along most of the length of the strap 20 is less than the angle at which the tip region 26 of the mold cavity 14 extends away from a vertical line through the portion 28 of the mold cavity defining most of the length of the strap 20.

Referring to FIG. 6, the first mold part 10 is further separated from the second mold 12 part, and the ejector pins 32 are protracted to eject the head 18 of the cable tie 16 from the head region 24 of the first mold part 10 by pushing on the head 18 with the ejector pins 32. At the same time the component 34 is also protracted to push on the strap 20 of the cable tie 16 at a position that is closely adjacent the head 18.

Referring to FIG. 7, the first mold part 10 is further separated from the second mold 12 part, and only the component 34 is further protracted to push the ejected head 18 of the cable tie 16 away from the ejector pins 32 by pushing on the strap 20 of the cable tie at the position that is closely adjacent the head 18. The ejector pins 32 are not further protracted. A forceful stream of air is then imparted on the head 18 from the closely adjacent nozzle 36 within the protracted component 34 to thereby quickly eject the cable tie 16 from between the first and second mold parts 10, 12.

The stream of air from the nozzle 36 also cools the head 18 of the cable tie 16 so that the cable tie can be ejected at an earlier time in the overall cycle.

The present invention obviates the need for ejection pins along most of the length of the mold cavity 14, as used in the prior art.

The present invention preferably is used In multi-cavity injection molding apparatus.

What is claimed is:

1. A method of injection molding a cable tie having a locking head, a strap terminating in a tip for passing through said head, and ratchet teeth on one side of the strap, wherein the locking head includes a pawl having teeth with surfaces for engaging the ratchet teeth to lock the strap in the locking head after the tip end of the strap has been pulled through the head, the method comprising the steps of (a) forming the cable tie by injecting molten plastic material into a mold cavity defined by a first mold part combined with a second mold part, wherein the first mold part includes a head region defining a portion of the head of the cable tie and the second mold part includes a tip region defining a portion of the tip of the cable tie;

(b) separating the first mold part from the second mold part while retaining said portion of the head of the cable tie in the head region of the first mold part and said portion of the tip of the cable tie in the tip region of the second mold part, to separate the head from the second mold part, to separate the tip from the first mold part, and to separate a major portion of the strap of the cable tie from the first and second mold parts;

(c) further separating the first mold part from the second mold part while retaining said portion of the head of the cable tie in the head region of the first mold part to thereby remove said portion of the tip of the cable tie from the second mold part; and (d) ejecting the head of the cable tie from the head region of the first mold part.

2. A method according to claim 1, wherein the tip region includes an undercut region for retaining said portion of the tip of the cable tie during step (b); and wherein step (c) includes removing the tip from the tip region by pulling the strap of the cable tie by further separating the first mold part from the second mold part while retaining said portion of the head of the cable tie in the first mold part.

3. A method according to claim 2, wherein the tip can be removed by sliding the tip from the undercut region by pulling the strap of the cable tie from the direction of the head; and wherein step (c) includes sliding said portion of the tip of the cable tie from the undercut region of the second mold part.

4. A method according to claim 2, wherein the tip region extends at an angle from a portion of the second mold part defining most of the strap, with said extension being directed away from the bulk of the first mold part.

5. A method according to claim 2, wherein the tip region extends at an angle from a portion of the second mold part defining most of the strap, with said extension being direct away from the bulk of the first mold part.

6. A method of injection molding an elongated article having a head and a strap terminating in a tip, the method comprising the steps of (a) forming the elongated article by injecting molten plastic material into a mold cavity defined between a first mold part combined with a second mold part, wherein the first mold part includes a head region defining a portion of the head of the elongated article, the second mold part includes a tip region defining a portion of the tip of the elongated article and the tip region includes an undercut region;

(b) separating the first mold part from the second mold part while retaining said portion of the head of the elongated article in the head region of the first mold part and said portion of the tip of the elongated article in the undercut region of the tip region of the second mold part, to separate the head from the second mold part, to separate the tip from the first mold part, and to separate a major portion of the strap of the elongated article from the first and second mold parts;

(c) further separating the first mold part from the second mold part while retaining said portion of the head of the elongated article in the head region of the first mold part to thereby remove said portion of the tip of the elongated article from the second mold part; and (d) ejecting the head of the elongated article from the head region of the first mold part;

wherein step (c) includes removing the tip from the tip region by pulling the strap of the elongated article by further separating the first mold part from the second mold part while retaining said portion of the head of the elongated article in the first mold part.

7. A method according to claim 6, wherein the tip can be removed by sliding the tip from the undercut region by pulling the strap of the elongated article from the direction of the head; and wherein step (c) includes sliding said portion of the tip of the elongated article from the undercut region of the second mold part.

8. A method according to claim 6, wherein the tip region extends at an angle from a portion of the second mold part defining most of the strap, with said extension being directed away from the bulk of the first mold part.

9. A method according to claim 6, wherein the tip region extends at an angle from a portion of the second mold part defining most of the strap, with said extension being directed away from the bulk of the first mold part.

* * * * *